US012633082B2

(12) United States Patent
Yan et al.

(10) Patent No.: US 12,633,082 B2
(45) Date of Patent: May 19, 2026

(54) METHOD FOR GENERATING CONTOUR DATA, COMPUTER DEVICE AND COMPUTER-READABLE STORAGE MEDIUM

(71) Applicant: OUR UNITED CORPORATION, Xi'an (CN)

(72) Inventors: Hao Yan, Xi'an (CN); Weiqun Yang, Xi'an (CN); Chun Luo, Xi'an (CN); Jinsheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 398 days.

(21) Appl. No.: 18/318,679

(22) Filed: May 16, 2023

(65) Prior Publication Data

US 2023/0377305 A1 Nov. 23, 2023

(30) Foreign Application Priority Data

May 17, 2022 (CN) .......................... 202210540502.8

(51) Int. Cl.
*G06V 10/46* (2022.01)
*G06T 7/20* (2017.01)
*G06V 20/52* (2022.01)

(52) U.S. Cl.
CPC ................ *G06V 10/46* (2022.01); *G06T 7/20* (2013.01); *G06V 20/52* (2022.01)

(58) Field of Classification Search
CPC .......... G06V 10/46; G06V 20/52; G06T 7/20; G06T 7/248; G06T 7/13; G06T 7/337; G06T 2207/10081; G06T 2207/30004; G06T 2207/30232; A61N 2005/1061; A61N 5/1049; A61B 6/469; A61B 6/5217
See application file for complete search history.

(56) References Cited

U.S. PATENT DOCUMENTS

2009/0190809 A1* 7/2009 Han ...................... G06V 10/755
                                                            382/128
2011/0182489 A1* 7/2011 Chang ........................ G06T 7/13
                                                            382/128
2015/0201889 A1* 7/2015 Roginska ............. A61B 5/4064
                                                            600/407

* cited by examiner

*Primary Examiner* — Jianxun Yang
(74) *Attorney, Agent, or Firm* — Kolitch Romano Dascenzo Gates LLP

(57) ABSTRACT

A method for generating contour data is provided. The method for generating contour data includes acquiring an image-guided contour of a target object, the image-guided contour including a target to be monitored; setting a contour type of the image-guided contour to be an image-guided type, which is customized in a contour type in contour data, wherein the image-guided contour of the image-guided type is intended to monitor motion of the target to be monitored of the target object; and saving contour data corresponding to the image-guided contour of the image-guided type in contour data of the target object.

8 Claims, 3 Drawing Sheets

S101

Acquiring an image-guided contour of a target object

S102

Setting a contour type of the image-guided contour to be an image-guided type

S103

Saving contour data corresponding to the image-guided contour of the image-guided type in contour data of the target object

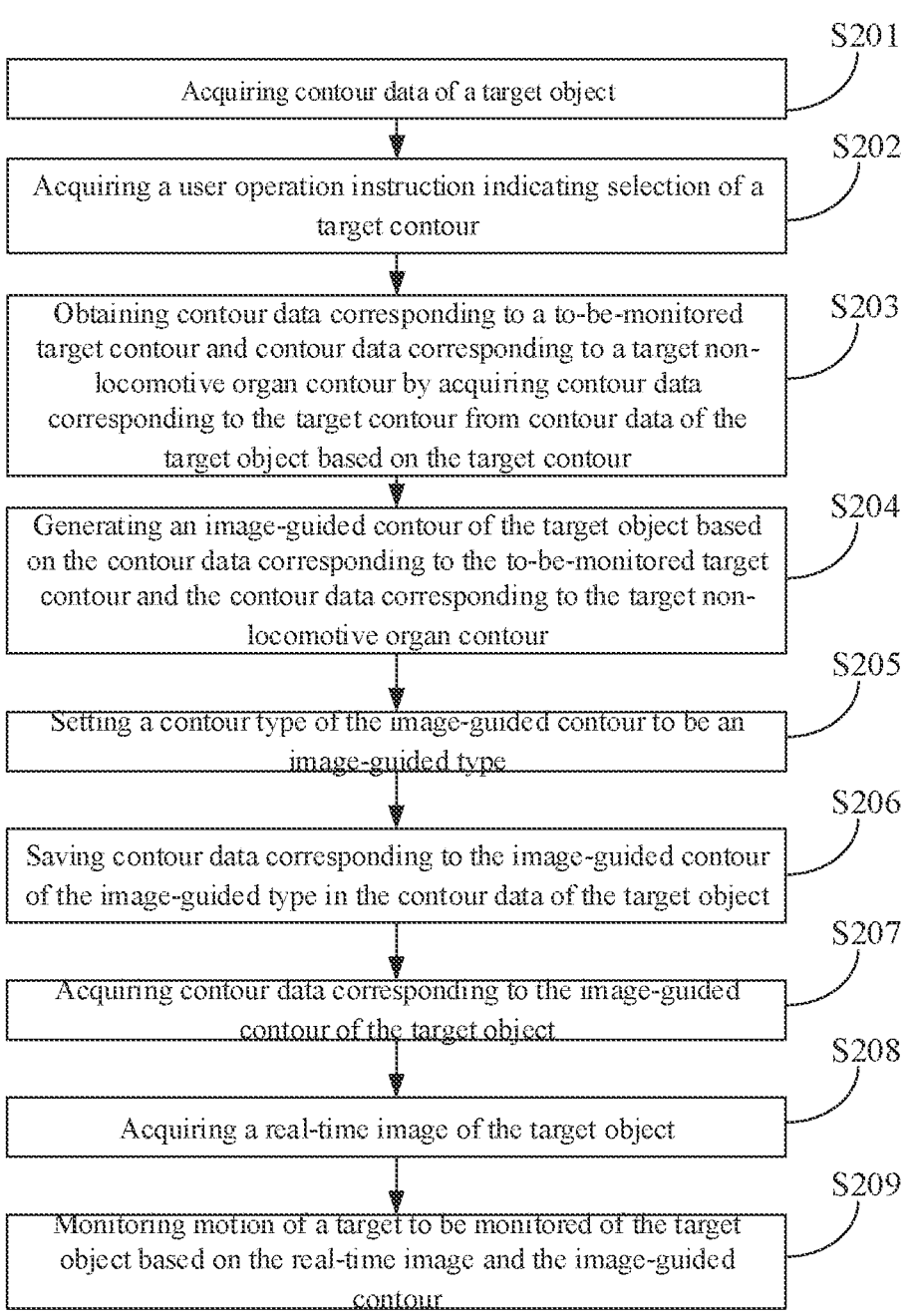

S201

Acquiring contour data of a target object

S202

Acquiring a user operation instruction indicating selection of a target contour

S203

Obtaining contour data corresponding to a to-be-monitored target contour and contour data corresponding to a target non-locomotive organ contour by acquiring contour data corresponding to the target contour from contour data of the target object based on the target contour

S204

Generating an image-guided contour of the target object based on the contour data corresponding to the to-be-monitored target contour and the contour data corresponding to the target non-locomotive organ contour

S205

Setting a contour type of the image-guided contour to be an image-guided type

S206

Saving contour data corresponding to the image-guided contour of the image-guided type in the contour data of the target object

S207

Acquiring contour data corresponding to the image-guided contour of the target object

S208

Acquiring a real-time image of the target object

S209

Monitoring motion of a target to be monitored of the target object based on the real-time image and the image-guided contour

FIG. 2

METHOD FOR GENERATING CONTOUR DATA, COMPUTER DEVICE AND COMPUTER-READABLE STORAGE MEDIUM

CROSS-REFERENCE TO RELATED APPLICATION

This application claims priority of China Patent Application No. 202210540502.8, filed on May 17, 2022 and entitled "CONTOUR DATA GENERATION METHOD, COMPUTER DEVICE, AND READABLE STORAGE MEDIUM", the disclosure of which is herein incorporated by reference in its entirety.

TECHNICAL FIELD

The present disclosure relates to the field of radiotherapy, and in particular, to a method for generating contour data, a computer device and a computer-readable storage medium.

BACKGROUND

With the rapid development of computer and imaging technologies, radiotherapy technologies are becoming more and more mature. Image-guided radiotherapy (IGRT), as a precise radiotherapy technology, is increasingly applied to clinical practice, thereby effectively ensuring the accuracy of radiotherapy, improving the local control rate of a tumor, and reducing the irradiation dose of normal tissues around the tumor.

SUMMARY

Embodiments of the present disclosure provide a method for generating contour data, a computer device, and a computer-readable storage medium.

In an aspect, a method for generating contour data is provided. The method includes: acquiring an image-guided contour of a target object, a target to be monitored being included within the image-guided contour; setting a contour type of the image-guided contour to be an image-guided type, which is customized in contour type in contour data; and saving contour data corresponding to the image-guided contour of the image-guided type in contour data of the target object, wherein the image-guided contour of the image-guided type is configured to monitor motion of the target to be monitored of the target object.

In some embodiments of the present disclosure, the contour data is RTSTRUCT data, and a contour type of the RTSTRUCT data does not include the image-guided type.

In some embodiments of the present disclosure, a target non-motion organ is further included within the image-guided contour, and acquiring the image-guided contour of the target object includes acquiring contour data of the target object, the contour data of the target object including contour data corresponding to a to-be-monitored target contour of the target to be monitored and contour data corresponding to a target non-motion organ contour of the target non-motion organ; and generating an image-guided contour of the target object based on the contour data corresponding to the to-be-monitored target contour and the contour data corresponding to the target non-motion organ contour.

In some embodiments of the present disclosure, after acquiring the contour data of the target object, the method further includes: acquiring a user operation instruction indicating selection of a target contour, the target contour including the to-be-monitored target contour and the target non-motion organ contour; and obtaining the contour data corresponding to the to-be-monitored target contour and the contour data corresponding to the target non-motion organ contour by acquiring contour data corresponding to the target contour from the contour data of the target object based on the target contour.

In some embodiments of the present disclosure, acquiring the image-guided contour of the target object includes: acquiring an image-guided contour of the target object delineated by a user.

In some embodiments of the present disclosure, before acquiring the image-guided contour of the target object, the method further includes: defining the image-guided type in the contour type of the contour data.

In some embodiments of the present disclosure, the method further includes: acquiring a user operation instruction indicating adjustment of the image-guided contour; and adjusting the image-guided contour.

In some embodiments of the present disclosure, after saving the contour data corresponding to the image-guided contour of the image-guided type, the method further includes: acquiring contour data corresponding to the image-guided contour of the target object; acquiring a real-time image of the target object, the real-time image including the target to be monitored; and monitoring the motion of the target to be monitored of the target object based on the real-time image and the image-guided contour.

In another aspect, a computer device is further provided by the present disclosure. The computer device includes one or more processors; and a memory storing one or more application programs therein; wherein the one or more processors, when loading and running the one or more application programs, are caused to perform any of the methods for generating contour data in the first aspect.

In a third aspect, a non-volatile computer-readable storage medium storing one or more computer programs thereon is further provided by the present disclosure. Wherein the one or more computer programs, when loaded and run by a processor, cause the processor to perform any of the methods for generating contour data in the first aspect.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and those skilled in the art may still derive other drawings from these accompanying drawings without creative efforts.

FIG. 2 is a schematic flowchart of another method for generating contour data according to some embodiments of the present disclosure;

DETAILED DESCRIPTION

Figure 1:
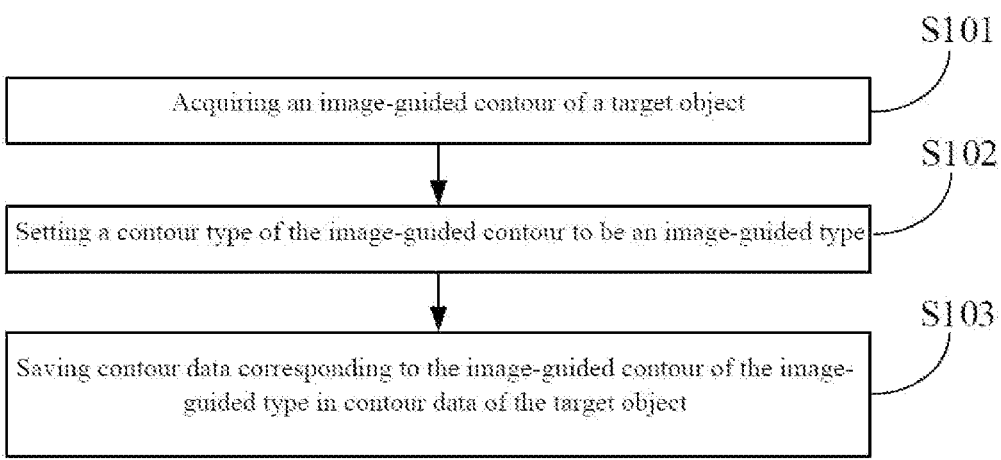
FIG. 1 is a schematic flowchart of a method for generating contour data according to some embodiments of the present disclosure.

The technical solutions in the embodiments of the present disclosure will be clearly and completely described below with reference to the accompanying drawings in the embodiments of the present disclosure. Obviously, the embodiments described are merely some but not all embodiments of the present disclosure. Based on the embodiments of the present disclosure, all other embodiments derived by those skilled in the art without creative efforts shall fall within the protection scope of the present disclosure.

In the description of the present disclosure, it should be understood that orientation or positional relationships indicated by the terms "center", "longitudinal", "transverse", "length", "width", "thickness", "upper", "lower", "front", "back", "left", "right", "vertical", "horizontal", "top", "bottom", "inner", "outer" and the like are orientation or position relationship shown based on the accompanying drawings and are merely intended to describe the present disclosure conveniently and simplify the description, rather than to indicate or imply that the referred apparatus or element must have a specific orientation or must be configured and operated at a specific orientation. Therefore, such terms should not be construed as limiting the present disclosure. Moreover, the terms "first", "second" and "third" are only for the purpose of description and should not be construed as indicating or implying relative importance or implicitly indicating the number of technical features indicated. Thus, the features defined by the terms "first", "second" and "third" may include one or more of the features either explicitly or implicitly. In the description of the present disclosure, unless otherwise expressly defined, the term "a plurality of" means two or more.

In order to enable any person skilled in the art to implement and use the present disclosure, the following description is given. In the following description, details are listed for the purpose of explanation. It should be understood that those of ordinary skill in the art can recognize that the present disclosure may also be implemented without using these specific details. In other examples, well-known structures and processes will not be elaborated in detail to avoid the situation that unnecessary details obscure the description of the present disclosure. Thus, the present disclosure is not intended to be limited to the shown embodiments, but should be consistent with the widest scope conforming to the principles and features disclosed herein.

It should be noted that since the method according to the embodiments of the present disclosure is executed in a computer device and processed objects of each computer device exist in the form of data or information, such as time, which is essentially time information, it can be understood that in subsequent embodiments, if sizes, quantities, positions, etc. are mentioned, they all exist in the form of corresponding data for facilitating processing by the computer device, and specific details will not be described here.

In an IGRT process, the motion of a patient, especially a target to be monitored (such as a target volume) of the patient is monitored. Generally, contour data corresponding to a body surface contour in a contour type (Type of ROI) of an external contour (EXTERNAL) is acquired from a radiotherapy structure set (RTSTRUCT) of digital imaging and communications in medicine (DICOM) files of the patient, and then, a volume corresponding to the contour data of the external contour type is used as a registration reference volume to register with a real-time image of the patient acquired in real time, such that the motion of the patient is monitored based on a registration result.

However, the contour data corresponding to the body surface contour in the EXTERNAL type generally contains more registration interference information, which leads to poor registration accuracy in image guidance and negatively affects the accuracy of motion monitoring.

A method for generating contour data, a computer device, and a computer-readable storage medium are provided according to the embodiments of the present disclosure, and are described in detail below, respectively.

A method for generating contour data is provided according to the embodiments of the present disclosure. An execution body of the method for generating contour data is a computer device. The method for generating contour data includes acquiring an image-guided contour of a target object, the image-guided contour including a target to be monitored; setting a contour type of the image-guided contour to be an image-guided type, which is a contour type customized in a contour type in contour data; and saving contour data corresponding to the image-guided contour of the image-guided type in contour data of the target object, wherein the image-guided contour of the image-guided type is configured to monitor motion of the target to be monitored of the target object.

FIG. 1 is a schematic flow chart of a method for generating contour data according to an embodiment of the present disclosure. As shown in FIG. 1, the method for generating contour data includes the S101 to S103, which are particularly as follows.

In S101, an image-guided contour of a target object is acquired.

When it is determined (or possible) to monitor the motion of a target to be monitored of the target object, a user sets the image-guided contour of the target object by a computer device according to requirements; and the target to be monitored is included within the image-guided contour. Correspondingly, the computer device acquires the image-guided contour of the target object.

Here, the user is a physician such as a physiatrist or radiotherapist. The target object is a patient, a phantom, or the like. The target to be monitored is a tumor to be treated with radiotherapy in the target object, or other organs, tissues, or markers (such as gold markers) that move with the tumor.

A method for acquiring the image-guided contour according to the embodiments of the present disclosure is flexible, and is not particularly limited by the embodiments of the present disclosure.

In some embodiments, the user selects an existing contour, including the above-mentioned target to be monitored, of the target object as the image-guided contour. Correspondingly, the computer device acquires the existing contour, including the above-mentioned target to be monitored, of the target object selected by the user and determines the contour including the above-mentioned target to be monitored as the image-guided contour. In this way, the existing contour of the target object is effectively utilized.

In some other embodiments, the user selects to automatically generate the image-guided contour. Correspondingly, the computer device automatically generates the image-guided contour, and for example, an image-guided contour including the above-mentioned target to be monitored is generated based on contour data of the existing contour of the target object. In this way, the speed of acquiring the image-guided contour is improved.

In some other embodiments, the user sketches an image-guided contour including the above-mentioned target to be monitored by himself. Correspondingly, the computer device acquires the image-guided contour including the above-mentioned target to be monitored as delineated by the user.

In S102, a contour type of the image-guided contour is set to be an image-guided type.

After acquiring the image-guided contour of the target object, the computer device sets the contour type of the image-guided contour to be the image-guided type. Here, the image-guided type is a contour type customized in a contour type in contour data.

The contour data referred to in the present disclosure is RTSTRUCT data. In a DICOM standard, the contour data has been defined as many different contour types such as contour types of an EXTERNAL, planning target volume (PTV), clinical target volume (CTV), gross tumor volume (GTV), treated volume, irradiated volume, ORGAN and organ at risk (OAR), which all have specific meanings in the DICOM standard, but it should be noted that the contour types of the contour data do not include the image-guided type specially used for motion monitoring.

In the embodiments of the present disclosure, a new contour type, namely the image-guided type, is defined in the contour type of the contour data, and the contour of this image-guided type (or contour data corresponding to the contour) is specially used for motion monitoring of the target object. Here, the motion monitoring includes setup before the treatment and/or real-time image guidance during the treatment. It should be noted that contour types of contours specially used for motion monitoring of the target object all belong to image-guided types defined in the technical solutions of the present disclosure, and the names of the image-guided types are named by the user himself.

It can be understood that before acquiring the image-guided contour of the target object, the contour type of the image-guided type has been defined in the contour type of the contour data in the computer device.

In S103, contour data corresponding to the image-guided contour of the image-guided type is saved in contour data of the target object.

The computer device saves the contour data corresponding to the image-guided contour of the image-guided type in the contour data of the target object, such that the contour data corresponding to the image-guided contour of the image-guided type is added to the contour data of the target object, and is intended to monitor the motion of the target to be monitored of the target object.

When monitoring the motion of the target to be monitored of the target object, the computer device acquires the saved contour data corresponding to the image-guided contour of the image-guided type of the target object, determines a volume corresponding to the image-guided contour of the image-guided type as a registration reference volume to register with a real-time image of a patient acquired in real time, and may controls to move the position of the target object based on a registration result, thereby monitoring the motion of the target to be monitored of the target object.

It should be noted that the motion monitoring here is performed in a setup stage of setting the target object prior image-guided radiotherapy, or in a treatment stage of the image-guided radiotherapy for the target to be monitored of the target object, which is not particularly limited in the embodiments of the present disclosure.

It should be noted that the image-guided contour of the image-guided type in the setup stage and the treatment stage is the same contour or different contours. In some embodiments, the image-guided contour of the image-guided type in the setup stage is a first image-guided contour of the image-guided type, and the image-guided contour of the image-guided type in the treatment stage is a second image-guided contour acquired upon adjusting the first image-guided contour of the image-guided type after the setup is completed.

According to the embodiments of the present disclosure, the new contour type, namely the image-guided type, is defined in advance in the contour type of the contour data. After the image-guided contour, including the target to be monitored, of the target object is acquired, the contour type is set to be the image-guided type, and the contour data corresponding to the image-guided contour of the image-guided type is saved in the contour data of the target object. Because the image-guided contour of the image-guided type is set according to the user's requirements, the registration reference volume corresponding to the image-guided contour of the image-guided type generally contains less registration interference information, thereby improving the accuracy of the motion monitoring of the target to be monitored of the target object.

The image-guided contour in the embodiments of the present disclosure is set according to the user's requirements. In a process of automatically generating the image-guided contour, in order to further improve the accuracy of registration between the registration reference volume corresponding to the image-guided contour and the real-time image, it is expected that the registration reference volume corresponding to the image-guided contour includes, in addition to the target to be monitored, a non-motion organ such as a bony organ that is convenient for registration. Meanwhile, the registration reference volume is within the volume corresponding to the body surface contour of the target object, such that the registration reference volume includes less other registration interference information, and the accuracy of the image registration is relatively high.

Therefore, another method for generating contour data is provided according to the embodiments of the present disclosure, which effectively improves registration accuracy, thereby improving the accuracy of motion monitoring of a target to be monitored of a target object. FIG. 2 is a schematic flowchart of another method for generating contour data according to some embodiments of the present disclosure. This method for generating contour data is applied to a computer device, as shown in FIG. 2, and includes S201 to S209, which are particularly as follows.

In S201, contour data of a target object is acquired.

The computer device acquires the contour data of the target object, namely, RTSTRUCT data of the target object. At least one contour of the target object is displayed on a display of the computer device. Here, the contour data of the target object is acquired from a treatment planning system.

In S202, a user operation instruction indicating the selection of a target contour is acquired.

A user can visualize at least one contour of the target object by the display of the computer device. In the case that it is determined that the target object needs image-guided radiotherapy, in one embodiment, the user can select a contour of interest, namely the target contour, from the contour of the target object by the computer device.

Here, the target contour includes a to-be-monitored target contour of the target to be monitored and a target non-motion organ contour of a target non-motion organ.

It should be noted that the non-motion organ is an organ or marker (such as a gold marker) that does not move with breathing motion, heartbeat, and other motions in a target object body, and its shape, size, and the like are unlikely to change. In some embodiments, the non-motion organ is a bony organ, such as a skull, a vertebra, and a rib, and the target non-motion organ is one or more of the non-motion organs of interest to the user.

In S203, the contour data corresponding to the to-be-monitored target contour and the contour data corresponding to the target non-motion organ contour are obtained by acquiring contour data corresponding to the target contour from the contour data of the target object based on the target contour.

After acquiring the user operation instruction indicating the selection of the target contour, the computer device obtains the contour data corresponding to the to-be-monitored target contour and the contour data corresponding to the target non-motion organ contour by acquiring the contour data corresponding to the target contour from the contour data of the target object based on the target contour.

In some embodiments, the computer device obtains the contour data corresponding to the to-be-monitored target contour and the contour data corresponding to the target non-motion organ contour by acquiring contour data corresponding to an identity (ID) of the target contour from the contour data of the target object based on the ID of the target contour.

In S204, an image-guided contour of the target object is generated based on the contour data corresponding to the to-be-monitored target contour and the contour data corresponding to the target non-motion organ contour.

The computer device generates the image-guided contour of the target object based on the contour data corresponding to the to-be-monitored target contour and the contour data corresponding to the target non-motion organ contour.

Here, the image-guided contour of the target object is within the body surface contour of the target object, and the to-be-monitored target contour and the target non-motion organ contour are disposed in the image-guided contour. That is, the image-guided contour is within the body surface contour of the target object, and a target to be monitored and a target non-motion organ are included within the image-guided contour.

Figure 3:
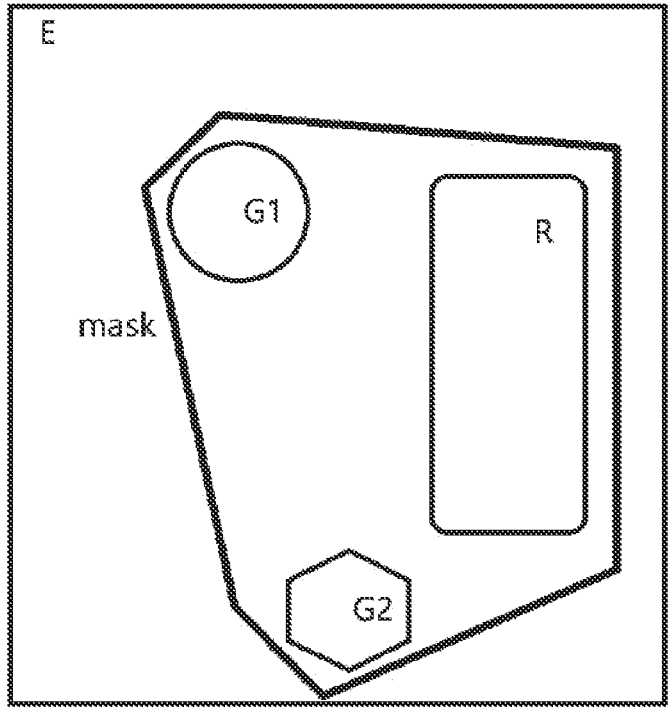
FIG. 3 is a schematic diagram of an image-guided contour according to some embodiments of the present disclosure.

In some embodiments, the image-guided contour is similarly understood as a "rubber band", the target to be monitored and the target non-motion organ are imagined as rigid objects, and the "rubber band" just wraps the target to be monitored and the target non-motion organ. In some embodiments, the computer device generates the image-guided contour of the target object from the contour data corresponding to the to-be-monitored target contour and the contour data corresponding to the target non-motion organ contour by a convex hull algorithm. As shown in FIG. 3, the image-guided contour (a contour of a mask) includes the contour of the target to be monitored (including a target volume G1 and a target volume G2) and the contour of the target non-motion organ (a bony volume R), the image-guided contour is within a body surface contour E, but includes less other organs or tissues. Here, the target volumes G1 and G2 are a PTV, CTV or other target volumes of the target object. In this way, the registration reference volume corresponding to the image-guided contour includes not only the target to be monitored and the target non-motion organ, but also as less other registration interference information as possible.

Through steps S202 to S204, the computer device acquires the image-guided contour of the target object. Alternatively, the computer device acquires an image-guided contour of the target object delineated by the user; and the image-guided contour includes the monitored target and the target non-motion organ.

In S205, a contour type of the image-guided contour is set to be an image-guided type.

Detailed explanation about it has been made in S102, and is not repeated herein.

In some embodiments, before S205, the computer device acquires a user operation instruction indicating adjustment of the image-guided contour and adjusts the contour of the image-guided contour based on the user operation instruction. In this way, the user can adjust the contour of the image-guided contour to better meet the user's requirements.

Correspondingly, S205 includes: setting a contour type of the adjusted image-guided contour to be the image-guided type.

In S206, contour data corresponding to the image-guided contour of the image-guided type is saved in the contour data of the target object.

Detailed explanation about it has been made in S103, and is not repeated herein.

Through steps S201 to S206, the computer device generates and saves the image-guided contour of the image-guided type of the target object for subsequent motion monitoring of the target to be monitored of the target object. See S207 to S209 for details.

It should be noted that at least one or all of the steps in S201 to S206 may be completed in a computer device that makes a treatment plan, and of course, may also be completed in a computer device that controls an image-guided process, which is not particularly limited in the embodiments of the present disclosure.

In S207, contour data corresponding to the image-guided contour of the target object is acquired.

In the case that it is determined to monitor the motion of the target object, the computer device acquires the contour data corresponding to the image-guided contour of the target object and determines a volume corresponding to the image-guided contour of the image-guided type as the registration reference volume.

It should be noted that the image-guided contour of the target object is displayed on the display for the user to view.

In S208, a real-time image of the target object is acquired.

In the case that it is determined to monitor the motion of the target object, the computer device also needs to acquire the real-time image of the target object; and the real-time image includes the target to be monitored and the target non-motion organ.

It should be noted that S208 is preceded by S207, which is not particularly limited in the embodiments of the present disclosure.

In S209, the motion of the target to be monitored of the target object is monitored based on the real-time image and the image-guided contour.

After acquiring the contour data corresponding to the image-guided contour of the target object and the real-time image, the computer device monitors the motion of the target to be monitored of the target object based on the real-time image and the image-guided contour.

In the embodiments of the present disclosure, the image-guided contour of the image-guided type specially used for monitoring the motion of the target to be monitored of the patient is set within the body surface contour of the target object according to the user requirements, the image-guided contour of the image-guided type includes not only the target to be monitored but also the target non-motion organ such as the bony organ, but includes fewer other organs or tissues. Correspondingly, the registration interference information in the registration reference volume corresponding to the image-guided contour is less, such that the registration accuracy is higher, and thus, the accuracy of the motion monitoring of the target to be monitored of the target object is relatively high.

Some embodiments of the present disclosure further provide a computer device. The computer device includes one or more processors; a memory storing one or more application programs therein. The one or more processors, when loading and running the one or more application programs, are caused to perform the method for generating contour data in any of above embodiments.

Figure 4:
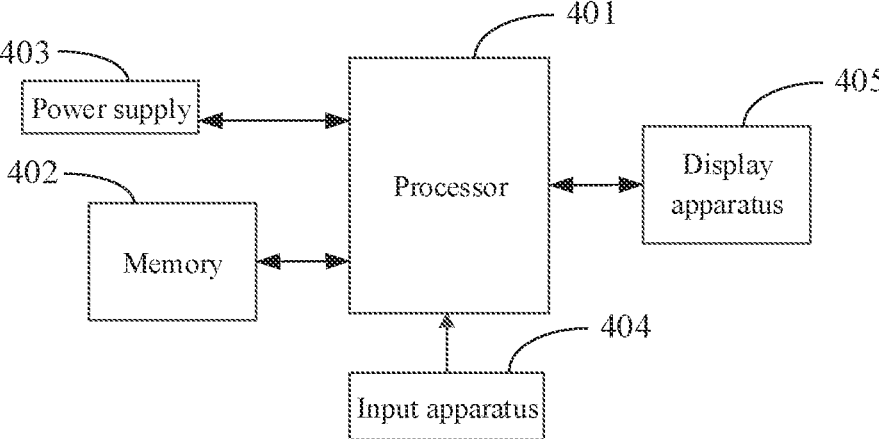
FIG. 4 is a schematic structural diagram of a computer device according to some embodiments of the present disclosure.

As shown in FIG. 4, it shows a structural schematic diagram of a computer device involved in the embodiments of the present disclosure. The details are as follows.

The computer device includes components such as a processor 401 having one or more processing cores, a memory 402 of one or more computer-readable storage media, a power supply 403, and an input apparatus 404. It may be understood by those skilled in the art that the computer device structures shown in FIG. 4 do not constitute a limitation to the computer device and the computer device may include more or fewer components than those shown in the figure, or combine certain components, or use different component arrangements.

The processor 401 is a control center of the computer device, and connects various parts of the entire computer device through various interfaces and lines. By running or executing software programs and/or modules stored in the memory 402 and invoking data stored in the memory 402, various functions and data processing of the computer device are implemented, thereby monitoring the computer device on the whole.

In some embodiments, the processor 401 includes one or more processing cores. Preferably, the processor 401 integrates an application processor and a modulation and demodulation processor. The application processor mainly processes an operating system, a user interface, an application program and the like, while the modulation and demodulation processor mainly processes wireless communication. It may be understood that the above modulation and demodulation processor may also not be integrated into the processor 401.

The memory 402 is configured to store software programs and modules, and the processor 401 executes various functional application and data processing by running the software programs and the modules stored in the memory 402. The memory 402 mainly includes a program storage area and a data storage area. The program storage area stores the operating system, an application program required for at least one function (such as a sound playing function and an image playing function), etc.; and the data storage area stores data created based on the use of the computer device, etc. In addition, the memory 402 includes a high-speed random access memory and further includes a non-volatile memory, such as at least one disk storage device, a flash memory device, or other volatile solid-state storage devices. Correspondingly, the memory 402 also includes a memory controller to provide access to the memory 402 by the processor 401.

The computer device also includes the power supply 403 that supplies power to various components. In some embodiments, the power supply 403 is logically connected to the processor 401 through a power supply management system, thereby achieving the functions such as management of charging, discharging, and power consumption through the power supply management system. The power supply 403 includes one or more DC or AC power supplies, a recharging system, a power failure detection circuit, a power converter or an inverter, a power status indicator, and any other components.

The computer device also includes an input apparatus 404. The input apparatus 404 is configured to receive input digital or character information, and generate keyboard, mouse, joystick, optical or trackball signal input related to user settings and function control.

The computer device also includes a display apparatus 405, etc. The display apparatus 405 is a display, and will not be repeated here.

In this embodiment, the processor 401 in the computer device loads, according to the following instructions, executable files corresponding to one or more application programs processes into the memory 402, and the processor 401 runs the application programs stored in the memory 402 to achieve various functions as follows:

acquiring an image-guided contour of a target object, wherein a target to be monitored is included within the image-guided contour; setting a contour type of the image-guided contour to be an image-guided type, wherein the image-guided type is customized in the contour type in contour data; and saving contour data corresponding to the image-guided contour of the image-guided type in contour data of the target object, wherein the image-guided contour of the image-guided type is configured to monitor motion of the target to be monitored of the target object.

In the embodiments of the present disclosure, the computer device 200 is an independent server, or a server network or a server cluster composed of multiple servers. For example, the computer device described in the embodiments of the present disclosure includes but is not limited to a computer, a network host, a single network server, a multi-network-server set, or a cloud server composed of a plurality of servers. The cloud server is composed of a large number of computers or network servers based on cloud computing.

In the embodiments of the present disclosure, the computer device 200 is a general-purpose computer device or a special-purpose computer device. In a specific implementation, the computer device is a desktop computer, a portable computer, a network server, a personal digital assistant (PDA), a mobile phone, a tablet computer, a wireless terminal device, a communication device, an embedded device, etc., and the type of the computer device is not limited in this embodiment.

Those of ordinary skill in the art may understand that all or part of the steps in the various methods of the above embodiments can be completed by instructions, or by controlling related hardware through instructions. The instructions is stored in a computer-readable storage medium and loaded and executed by the processor.

For this purpose, some embodiments of the present disclosure provide a non-volatile computer-readable storage medium. The storage medium includes a read-only memory (ROM), a random access memory (RAM), a disk or an optical disc, etc. and stores a computer program thereon, which is loaded by a processor to execute steps in any of the method for generating contour data provided in the embodiments of the present disclosure. For example, the computer program is loaded by the processor to execute the following steps:

acquiring an image-guided contour of a target object, wherein a target to be monitored is included within the image-guided contour; setting a contour type of the image-guided contour to be an image-guided type, wherein the image-guided type is customized in the contour type in contour data; and saving contour data corresponding to the image-guided contour of the image-guided type in contour data of the target object, wherein the image-guided contour of the image-guided type is configured to monitor motion of the target to be monitored of the target object.

In the above embodiments, the description of each embodiment has its own emphasis. The parts that are not detailed in certain embodiment may refer to the detailed description for other embodiments above and are not repeated here.

During specific implementation, the above various structures are implemented as independent entities, or are arbitrarily combined to be implemented as the same or several entities. The specific implementations of the above various structures may refer to the foregoing method embodiments, and are not repeated here.

The specific implementations of the above various operations may refer to the foregoing embodiments, and are not repeated here.

The method for generating contour data, the computer device and the storage medium provided by the embodiments of the present disclosure have been described in detail above. Specific examples are used herein to explain the principles and embodiments of the present disclosure. The descriptions of the above embodiments are only configured to help understand the method and the core idea of the present disclosure. Meanwhile, for those of ordinary skill in the art, there will be changes in the specific embodiments and the application scope according to the idea of the present disclosure. In summary, the content of the Description should not be understood as a limitation to the present disclosure.

The invention claimed is:

1. A method for generating contour data, comprising:
acquiring contour data of a target object;
acquiring a user operation instruction indicating selection of a target contour, wherein the target contour comprises a to-be-monitored target contour of a target to be monitored and a target non-motion organ contour of a target non-motion organ, the target non-motion organ being a bony organ;
obtaining contour data corresponding to the to-be-monitored target contour and contour data corresponding to the target non-motion organ contour by acquiring contour data corresponding to the target contour from the contour data of the target object based on the target contour;
generating an image-guided contour of the target object based on the contour data corresponding to the to-be-monitored target contour and the contour data corresponding to the target non-motion organ contour;
setting a contour type of the image-guided contour to be an image-guided type, wherein the image-guided type is customized in a contour type in contour data; and
saving contour data corresponding to the image-guided contour of the image-guided type in the contour data of the target object, wherein the image-guided contour of the image-guided type is configured to monitor motion of the target to be monitored of the target object;
when monitoring the motion of the target to be monitored of the target object, acquiring the contour data corresponding to the image-guided contour of the image-guided type of the target object;
acquiring a real-time image of the target object, wherein the target to be monitored is comprised within the real-time image; and monitoring the motion of the target to be monitored of the target object by determining a volume corresponding to the image-guided contour of the image-guided type as a registration reference volume to register with the real-time image.

2. The method according to claim 1, wherein the contour data of the target object is RTSTRUCT data, and a contour type of the RTSTRUCT data does not comprise the image-guided type.

3. The method according to claim 1, further comprising:
acquiring a user operation instruction indicating adjustment of the image-guided contour; and
adjusting the image-guided contour.

4. A computer device, comprising:
one or more processors; and
a memory storing one or more application programs therein; wherein
the one or more processors, when loading and running the one or more application programs, are caused to perform:
acquiring contour data of a target object;
acquiring a user operation instruction indicating selection of a target contour, wherein the target contour comprises a to-be-monitored target contour of a target to be monitored and a target non-motion organ contour of a target non-motion organ, the target non-motion organ being a bony organ;
obtaining contour data corresponding to the to-be-monitored target contour and contour data corresponding to the target non-motion organ contour by acquiring contour data corresponding to the target contour from the contour data of the target object based on the target contour;
generating an image-guided contour of the target object based on the contour data corresponding to the to-be-monitored target contour and the contour data corresponding to the target non-motion organ contour;
setting a contour type of the image-guided contour to be an image-guided type, wherein the image-guided type is customized in a contour type in contour data; and
saving contour data corresponding to the image-guided contour of the image-guided type in the contour data of the target object, wherein the image-guided contour of the image-guided type is configured to monitor motion of the target to be monitored of the target object;
when monitoring the motion of the target to be monitored of the target object, acquiring the contour data corresponding to the image-guided contour of the image-guided type of the target object;
acquiring a real-time image of the target object, wherein the target to be monitored is comprised within the real-time image; and
monitoring the motion of the target to be monitored of the target object by determining a volume corresponding to the image-guided contour of the image-guided type as a registration reference volume to register with the real-time image.

5. The computer device according to claim 4, wherein the contour data of the target object is RTSTRUCT data, and a contour type of the RTSTRUCT data does not comprise the image-guided type.

6. The computer device according to claim 4, wherein the one or more processors, when loading and running the one or more application programs, are caused to perform:

acquiring a user operation instruction indicating adjustment of the image-guided contour; and adjusting the image-guided contour.

7. A non-transitory and non-volatile computer-readable storage medium, storing one or more computer programs thereon, wherein the one or more computer programs, when loaded and run by a processor, cause the processor to perform:

acquiring contour data of a target object;

acquiring a user operation instruction indicating selection of a target contour, wherein the target contour comprises a to-be-monitored target contour of a target to be monitored and a target non-motion organ contour of a target non-motion organ, the target non-motion organ being a bony organ;

obtaining contour data corresponding to the to-be-monitored target contour and contour data corresponding to the target non-motion organ contour by acquiring contour data corresponding to the target contour from the contour data of the target object based on the target contour;

generating an image-guided contour of the target object based on the contour data corresponding to the to-be-monitored target contour and the contour data corresponding to the target non-motion organ contour;

setting a contour type of the image-guided contour to be an image-guided type, wherein the image-guided type is customized in a contour type in contour data; and saving contour data corresponding to the image-guided contour of the image-guided type in the contour data of the target object, wherein the image-guided contour of the image-guided type is configured to monitor motion of the target to be monitored of the target object;

when monitoring the motion of the target to be monitored of the target object, acquiring the contour data corresponding to the image-guided contour of the image-guided type of the target object;

acquiring a real-time image of the target object, wherein the target to be monitored is comprised within the real-time image; and monitoring the motion of the target to be monitored of the target object by determining a volume corresponding to the image-guided contour of the image-guided type as a registration reference volume to register with the real-time image.

8. The non-transitory and non-volatile computer-readable storage medium according to claim 7, wherein the contour data of the target object is RTSTRUCT data, and a contour type of the RTSTRUCT data does not comprise the image-guided type.

* * * * *